(12) United States Patent
Rayl et al.

(10) Patent No.: US 8,631,688 B1
(45) Date of Patent: Jan. 21, 2014

(54) SYSTEM AND METHOD FOR DETECTING A FAULT IN A PRESSURE SENSOR THAT MEASURES PRESSURE IN A HYDRAULIC VALVE ACTUATION SYSTEM

(75) Inventors: Allen B. Rayl, Waterford, MI (US); Daniel G. Brennan, Brighton, MI (US); Craig D. Marriott, Clawson, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 13/603,979

(22) Filed: Sep. 5, 2012

(51) Int. Cl.
*G01M 15/09* (2006.01)
(52) U.S. Cl.
USPC ..................................... 73/114.33; 73/114.79
(58) Field of Classification Search
USPC .............. 73/114.33, 114.77, 114.79
See application file for complete search history.

(56) References Cited

U.S. PATENT DOCUMENTS

| | | | |
|---|---|---|---|
| 7,077,082 B2 * | 7/2006 | Bloms et al. | 123/90.12 |
| 7,698,935 B2 * | 4/2010 | Dibble et al. | 73/114.79 |
| 7,921,710 B2 * | 4/2011 | Cinpinski et al. | 73/114.79 |
| 8,047,065 B2 * | 11/2011 | Cinpinski et al. | 73/114.79 |
| 8,181,508 B2 * | 5/2012 | Cinpinski et al. | 73/114.79 |

* cited by examiner

*Primary Examiner* — Freddie Kirkland, III

(57) ABSTRACT

A system according to the present disclosure includes a pressure estimation module and a fault detection module. The pressure estimation module estimates a pressure of hydraulic fluid in a valve actuation system that actuates at least one of an intake valve and an exhaust valve of an engine. The fault detection module compares the estimated pressure to a pressure measured by a pressure sensor disposed in the valve actuation system and detects a fault in the pressure sensor based on a difference between the estimated pressure and the measured pressure.

20 Claims, 3 Drawing Sheets

SYSTEM AND METHOD FOR DETECTING A FAULT IN A PRESSURE SENSOR THAT MEASURES PRESSURE IN A HYDRAULIC VALVE ACTUATION SYSTEM

FIELD

The present disclosure relates to systems and methods for detecting a fault in a pressure sensor that measures pressure in a hydraulic valve actuation system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture within cylinders to drive pistons, which produces drive torque. Air enters the cylinders through intake valves. Fuel may be mixed with the air before or after the air enters the cylinders. In spark-ignition engines, spark initiates combustion of the air/fuel mixture in the cylinders. In compression-ignition engines, compression in the cylinders combusts the air/fuel mixture in the cylinders. Exhaust exits the cylinders through exhaust valves.

A valve actuator actuates the intake and exhaust valves. The valve actuator may be driven by a camshaft. For example, the valve actuator may be a hydraulic lifter that is coupled to the camshaft using a pushrod or directly coupled to the camshaft. Alternatively, the valve actuator may actuate the intake and exhaust valves independent from a camshaft. For example, the valve actuator may be hydraulic, pneumatic, or electromechanical, and may be included in a camless engine or a camless valvetrain.

SUMMARY

A system according to the present disclosure includes a pressure estimation module and a fault detection module. The pressure estimation module estimates a pressure of hydraulic fluid in a valve actuation system that actuates at least one of an intake valve and an exhaust valve of an engine. The fault detection module compares the estimated pressure to a pressure measured by a pressure sensor disposed in the valve actuation system and detects a fault in the pressure sensor based on a difference between the estimated pressure and the measured pressure.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A hydraulic valve actuation system may include a low-pressure pump and a high-pressure pump. The low-pressure pump may supply hydraulic fluid from a reservoir to the high-pressure pump through a low-pressure rail. The high pressure pump may supply hydraulic fluid from the low-pressure rail to one or more valve actuators through a high-pressure rail. The low-pressure pump may be electric, and the high-pressure pump may be driven by an engine. The valve actuators may actuate an intake valve and/or an exhaust valve of the engine.

A low-pressure sensor may measure a pressure of hydraulic fluid in the low-pressure rail. A high-pressure sensor may measure a pressure of hydraulic fluid in the high-pressure rail. The low-pressure pump and/or the high-pressure pump may be controlled based on input from the low-pressure sensor, and the high-pressure pump may be controlled based on input from the high-pressure sensor. If there is a fault in the low-pressure sensor or the high-pressure sensor, the low-pressure pump and/or the high-pressure pump may be replaced unnecessarily, which increases warranty costs.

An engine control system and method according to the principles of the present disclosure detects a fault in a low-pressure sensor and a high-pressure sensor used in a hydraulic valve actuation system. A first pressure in a low-pressure supply rail is estimated based on one or more factors and compared to a first pressure measured by the low-pressure sensor. A fault in the low-pressure sensor is detected based on a difference between the estimated first pressure and the measured first pressure.

A second pressure in a high-pressure supply rail is estimated based on one or more factors and compared to a second pressure measured by the high-pressure sensor. A fault in the high-pressure sensor is detected based on a difference between the estimated second pressure and the measured second pressure. A diagnostic trouble code (DTC) may be set and/or a service indicator may be activated when a fault is detected in the low-pressure sensor and/or the high-pressure sensor.

Figure 1:
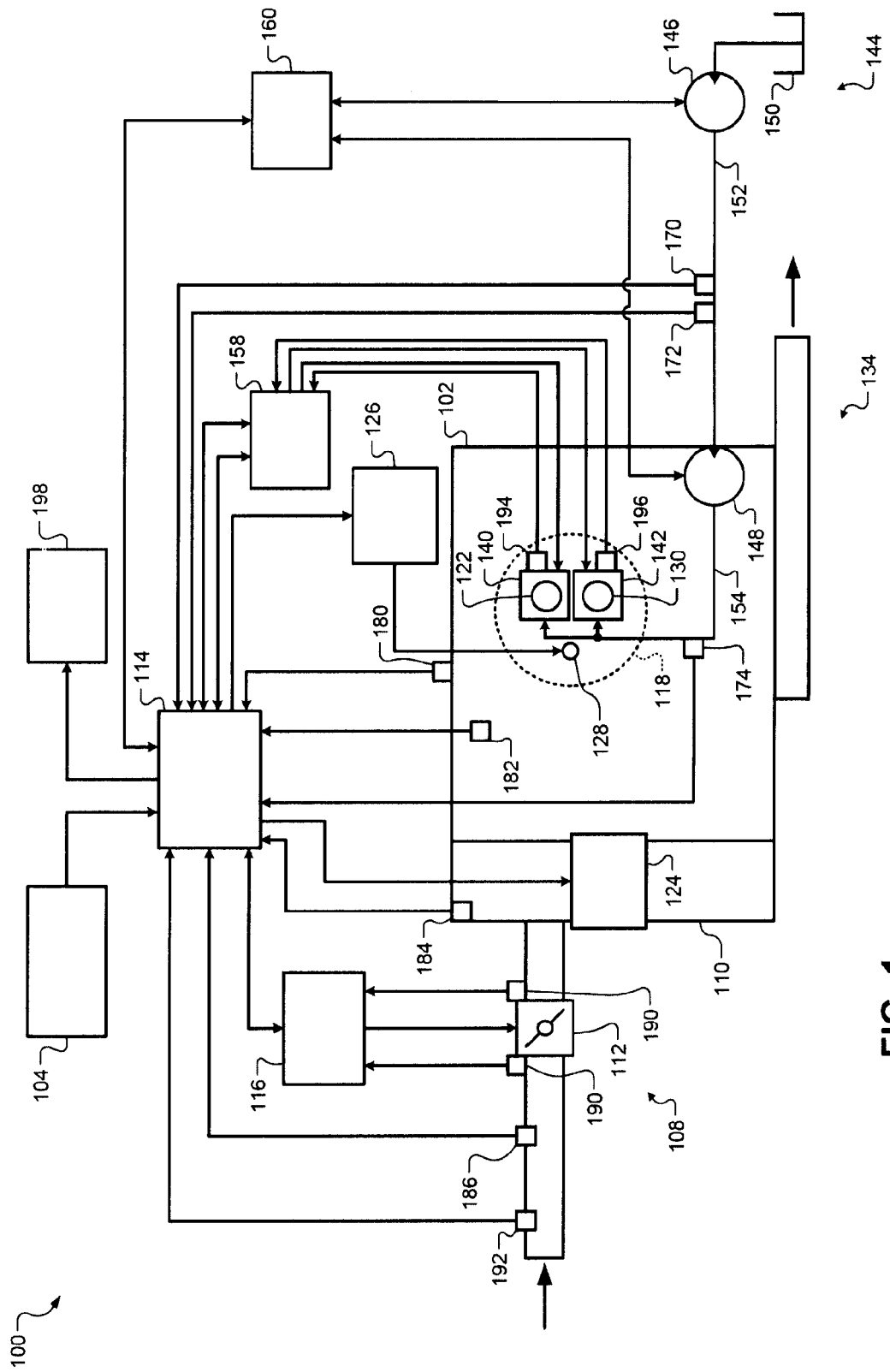
FIG. 1 is a functional block diagram of an example engine system according to the principles of the present disclosure.

Referring now to FIG. 1, an example implementation of an engine system 100 includes an engine 102 that combusts an air/fuel mixture to produce drive torque for a vehicle based on driver input from a driver input module 104. Air is drawn into the engine 102 through an intake system 108. In the example implementation, the intake system 108 includes an intake manifold 110 and a throttle valve 112. In various examples, the throttle valve 112 includes a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, or 12 cylinders. The ECM 114 may deactivate one or more of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel is injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crank angle. In various implementations, the spark actuator module 126 may halt provision of spark to deactivated cylinders.

Generating the spark may be referred to as a firing event. The spark actuator module 126 has the ability to vary the timing of the spark for each firing event. The spark actuator module 126 is capable of varying the spark timing for a next firing event when the spark timing signal is changed between a last firing event and the next firing event. In various implementations, the spark actuator module 126 varies the spark timing relative to TDC by the same amount for all of the cylinders in the engine 102. The spark timing relative to TDC may be different for different cylinders in the engine 102, for example, during transient conditions when the engine 102 is accelerating and/or when spark knock occurs in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 is actuated using an intake valve actuator 140, while the exhaust valve 130 is actuated using an exhaust valve actuator 142. In various examples, the intake valve actuator 140 actuates multiple intake valves (including the intake valve 122) of the cylinder 118. In various examples, the exhaust valve actuator 142 actuates multiple exhaust valves (including the exhaust valve 130) of the cylinder 118. Additionally, a single valve actuator may actuate one or more exhaust valves of the cylinder 118 and one or more intake valves of the cylinder 118.

The intake valve actuator 140 and the exhaust valve actuator 142 actuate the intake valve 122 and the exhaust valve 130, respectively, independent from a camshaft. In this regard, the valve actuators 140, 142 may be hydraulic, pneumatic, or electromechanical and may be used in a camless valvetrain, and the engine 102 may be a camless engine. As presently shown, the valve actuators 140, 142 are hydraulic, and a hydraulic system 144 supplies hydraulic fluid to the valve actuators 140, 142.

The hydraulic system 144 includes a low-pressure pump 146, a high-pressure pump 148, and a reservoir 150. The low-pressure pump 146 supplies hydraulic fluid from the reservoir 150 to the high-pressure pump 148 through a supply rail 152. The high-pressure pump 148 supplies hydraulic fluid from the supply rail 152 to the valve actuators 140, 142 through a supply rail 154. The low-pressure pump 146 may be electric and the high-pressure pump 148 may be driven by the engine 102.

A valve actuator module 158 controls the intake valve actuator 140 and the exhaust valve actuator 142 based on signals from the ECM 114. The valve actuator module 158 controls the intake valve actuator 140 to adjust the lift, duration, and/or timing of the intake valve 122. The valve actuator module 158 controls the exhaust valve actuator 142 to adjust the lift, duration, and/or timing of the exhaust valve 130.

A pump actuator module 160 controls the low-pressure pump 146 and the high-pressure pump 148 based on signals from the ECM 114. The pump actuator module 160 controls the low-pressure pump 146 to adjust the pressure of hydraulic fluid in the supply rail 152. The pump actuator module 160 controls the high-pressure pump 148 to adjust the pressure of hydraulic fluid in the supply rail 154.

The temperature of hydraulic fluid in the hydraulic system 144 is measured using a hydraulic fluid temperature (HFT) sensor 170. The HFT sensor 170 may be located in the supply rail 152 or at another location in the hydraulic system 144. The pressure of hydraulic fluid in the supply rail 152 is measured using a low-pressure sensor (LPS) 172. The pressure of hydraulic fluid in the supply rail 154 is measured using a high-pressure sensor (HPS) 174.

The position of the crankshaft is measured using a crankshaft position (CKP) sensor 180. The temperature of the engine coolant is measured using an engine coolant temperature (ECT) sensor 182. The ECT sensor 182 may be located within the engine 102 or at other locations where the coolant is circulated, such as a radiator (not shown). The pressure within the intake manifold 110 is measured using a manifold absolute pressure (MAP) sensor 184.

The mass flow rate of air flowing into the intake manifold 110 is measured using a mass air flow (MAF) sensor 186. In various implementations, the MAF sensor 186 may be located in a housing that also includes the throttle valve 112. The position of the throttle valve 112 is measured using one or more throttle position sensors (TPS) 190. The ambient temperature of air being drawn into the engine 102 is measured using an intake air temperature (IAT) sensor 192.

The position of the intake valve 122 is measured using an intake valve position (IVP) sensor 194. The position of the exhaust valve 130 is measured using an exhaust valve position (EVP) sensor 196. The valve position sensors 194, 196 may output the positions of the valves 122, 130 to the valve actuator module 158, and the valve actuator module 158 may output the positions of the valves 122, 130 to the ECM 114. Alternatively, the valve position sensors 194, 196 may output the positions of the valves 122, 130 directly to the ECM 114. The ECM 114 uses signals from the sensors to make control decisions for the engine system 100.

The ECM 114 estimates a first pressure of hydraulic fluid in the supply rail 152 and a second pressure of hydraulic fluid in the supply rail 154. The ECM 114 detects a fault in the LPS 172 based on a difference between the estimated first pressure and a pressure measured by the LPS 172. The ECM 114 detects a fault in the HPS 174 based on a difference between the estimated second pressure and a pressure measured by the HPS 174. The ECM 114 may set a diagnostic trouble code (DTC) and/or activate a service indicator 198 when a fault is detected. The service indicator 198 indicates that service is required using a visual message (e.g., text), an audible message (e.g., chime), and/or a tactile message (e.g., vibration).

Figure 2:
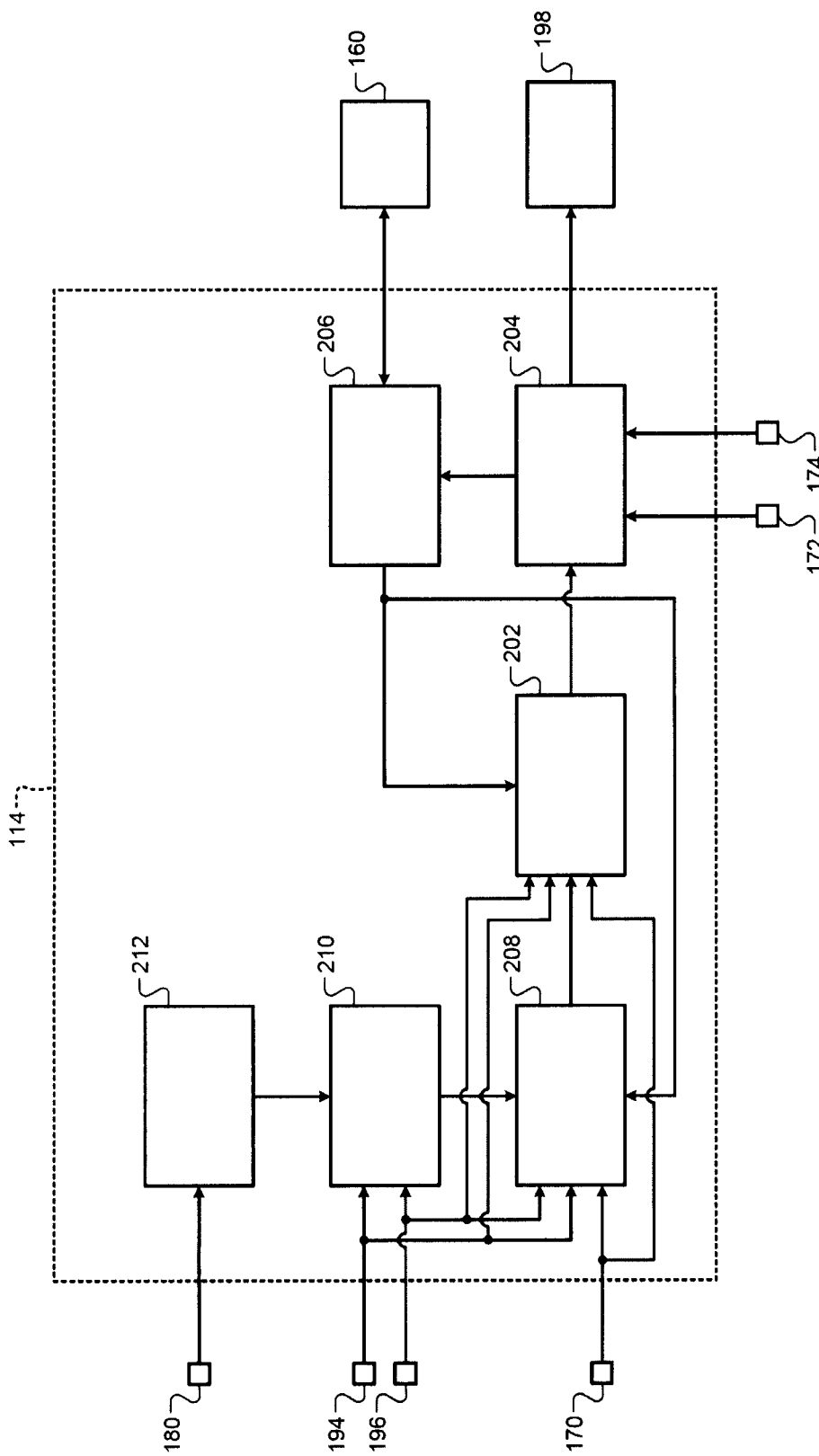
FIG. 2 is a functional block diagram of an example engine control system according to the principles of the present disclosure.

Referring now to FIG. 2, an example implementation of the ECM 114 includes a pressure estimation module 202 and a fault detection module 204. The pressure estimation module 202 estimates a first pressure of hydraulic fluid in the supply rail 152. The pressure estimation module 202 estimates the first pressure based on a temperature of hydraulic fluid in the hydraulic system 144, a speed of the low-pressure pump 146, and/or a mass flow rate of hydraulic fluid in the hydraulic system 144.

The pressure estimation module 202 receives the hydraulic fluid temperature from the HFT sensor 170. The pressure estimation module 202 may receive the speed of the low-pressure pump 146 from a pump control module 206. The pump control module 206 may receive the speed of the low-pressure pump 146 from the pump actuator module 160. The pump actuator module 160 may receive the speed of the low-pressure pump 146 from a sensor located in the low-pressure pump 146. The pressure estimation module 202 receives the mass flow rate from a flow rate estimation module 208.

The flow rate estimation module 208 estimates the mass flow rate based on the hydraulic fluid temperature and/or a desired pressure of hydraulic fluid in the hydraulic system 144. The flow rate estimation module 208 receives the hydraulic fluid temperature from the HFT sensor 170. The flow rate estimation module 208 may receive the desired pressure from the pump control module 206. The pump control module 206 may control the low-pressure pump 146 and/or the high pressure pump 148 through the pump actuator module 160 based on the desired pressure.

The flow rate estimation module 208 may estimate the mass flow rate based on an amount by which the intake valve 122 and/or the exhaust valve 130 are lifted and/or a duration for which the intake valve 122 and/or the exhaust valve 130 are opened. The flow rate estimation module 208 may estimate the mass flow rate based on a frequency at which the intake valve 122 and/or the exhaust valve 130 are opened.

The flow rate estimation module 208 determines the amount by which the intake valve 122 is lifted and/or the duration for which the intake valve 122 is opened based on input from the IVP sensor 194. The flow rate estimation module 208 determines the amount by which the exhaust valve 130 is lifted and/or the duration for which the exhaust valve 130 is opened based on input from the EVP sensor 196. The flow rate estimation module 208 receives the opening frequency of the intake valve 122 and/or the exhaust valve 130 from a frequency determination module 210.

The frequency determination module 210 determines the opening frequency of the intake valve 122 based on engine speed and a number of times that the intake valve 122 is opened during an engine cycle. The frequency determination module 210 determines the opening frequency of the exhaust valve 130 based on the engine speed and a number of times that the exhaust valve 130 is opened during an engine cycle.

The number of times that the intake valve 122 and/or the exhaust valve 130 are opened during an engine cycle may be predetermined and/or determined based on input from the CKP sensor 180, the IVP sensor 194, and/or the EVP sensor 196.

The frequency determination module 210 receives the engine speed from a speed determination module 212. The speed determination module 212 may determine the engine speed based on input from the CKP sensor 180. For example, the speed determination module 212 may calculate the engine speed based on a period that elapses as the crankshaft completes one or more revolutions.

The pressure estimation module 202 estimates a second pressure of hydraulic fluid in the supply rail 154. The pressure estimation module 202 estimates the second pressure based on the hydraulic fluid temperature and a speed at which the intake valve 122 and/or the exhaust valve 130 are opened. The pressure estimation module 202 determines the opening speed of the intake valve 122 based on input from the IVP sensor 194. The pressure estimation module 202 determines the opening speed of the exhaust valve 130 based on input from the EVP sensor 196.

The fault detection module 204 receives the first pressure and the second pressure as estimated by the pressure estimation module 202. The fault detection module 204 compares the estimated first pressure to a first pressure measured by the LPS 172. The fault detection module 204 may detect a fault in the LPS 172 when a difference between the estimated first pressure and the measured first pressure is greater than a first threshold. The fault detection module 204 may determine upper and lower limits based on the estimated first pressure and detect a fault in the LPS 172 when the measured first pressure is outside of the upper and lower limits.

The fault detection module 204 compares the estimated second pressure to a second pressure measured by the HPS 174. The fault detection module 204 may detect a fault in the HPS 174 when a difference between the estimated second pressure and the measured second pressure is greater than a second threshold. The fault detection module 204 may determine upper and lower limits based on the estimated second pressure and detect a fault in the HPS 174 when the measured second pressure is outside of the upper and lower limits. The fault detection module 204 may set a DTC and/or activate the service indicator 198 when a fault is detected.

The ECM 114 may take one or more remedial actions when a fault is detected in the LPS 172 or the HPS 174. For example, the pump control module 206 may control the low-pressure pump 146 and/or the high-pressure pump 148 based on the estimated pressures instead of the measured pressures. In addition, the pump control module 206 may limit the duty cycle(s) of the low-pressure pump 146 and/or the high-pressure pump 148. Furthermore, the ECM 114 may adjust throttle position, fuel delivery, and/or spark generation to limit the engine speed to a predetermined speed.

Figure 3:
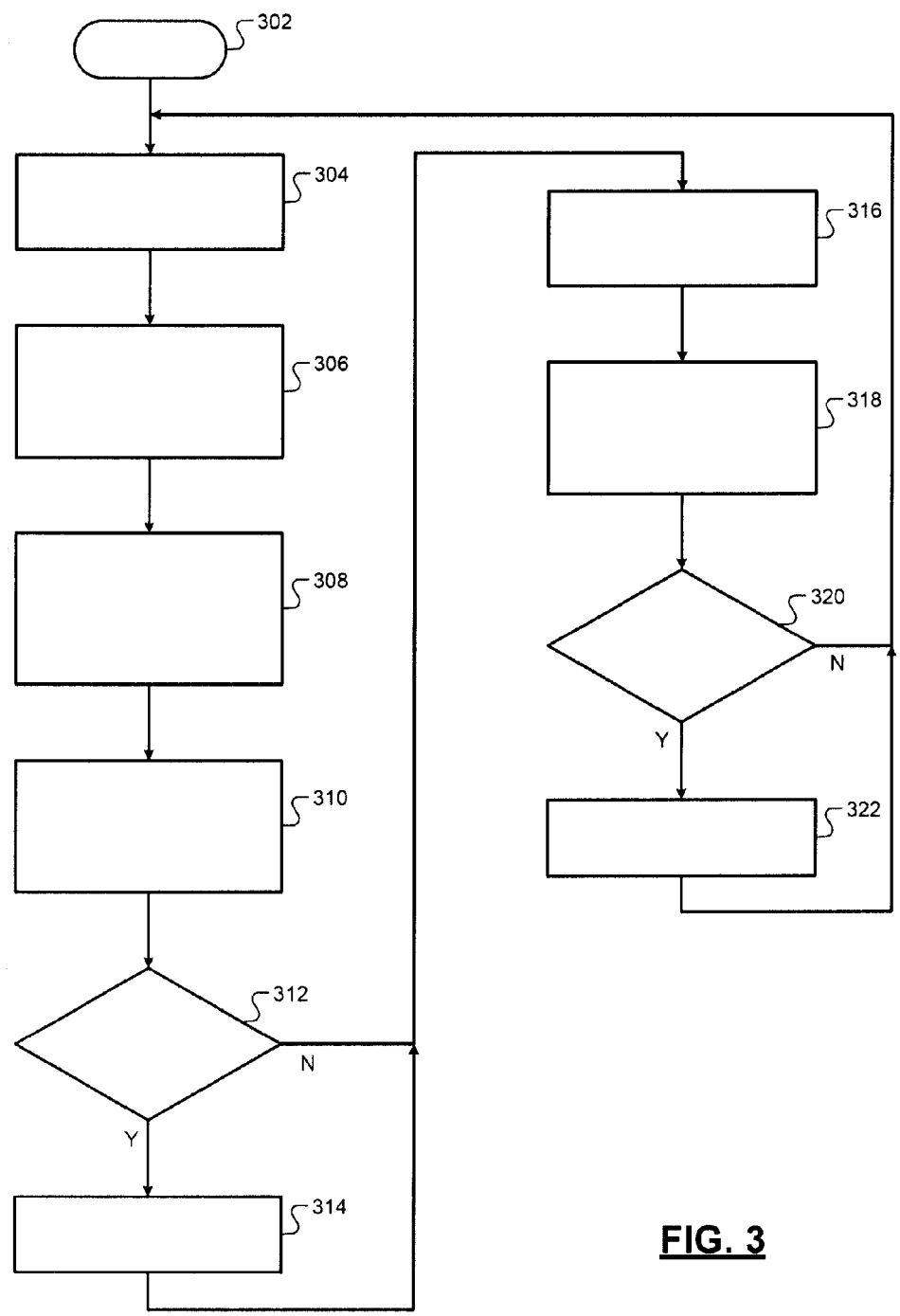
FIG. 3 is a flowchart illustrating an example engine control method according to the principles of the present disclosure.

Referring now to FIG. 3, a method for detecting a fault in a low-pressure sensor and a high-pressure sensor in a hydraulic valve actuation system begins at 302. At 304, the method measures a first pressure using the low-pressure sensor. The low-pressure sensor may be located in a first supply rail routed from a low-pressure pump to a high-pressure pump. The low-pressure pump may be electric and the high-pressure pump may be driven by an engine.

At 306, the method determines a valve event rate. The valve event rate is the frequency of a valve event such as when an intake valve and/or an exhaust valve of the engine are opened. The method determines the valve event rate based on engine speed and a number of valve events per engine cycle.

At 308, the method estimates a mass flow rate of hydraulic fluid in the system based on a measured temperature of hydraulic fluid in the system, a desired pressure of hydraulic fluid in the system, the valve event rate, a valve lift amount, and/or valve lift duration. The valve lift amount is the amount by which the intake valve and/or the exhaust valve are lifted. The valve lift duration is the duration for which the intake valve and/or the exhaust valve are opened. The valve lift amount and the valve lift duration may be determined based on input from a valve position sensor.

At 310, the method estimates the first pressure based on the mass flow rate, a speed of the low-pressure pump, and/or the measured temperature of hydraulic fluid in the system. The speed of the low-pressure pump may be measured using a sensor that is located in the low-pressure pump. At 312, the method determines whether a first (e.g., absolute) difference between the estimated first pressure and the measured first pressure is greater than a first threshold. If the first difference is greater than the first threshold, the method continues at 314. Otherwise, the method continues at 316.

At 314, the method detects a fault in the low-pressure sensor. The method may activate a service indicator when a fault is detected in the low-pressure sensor. The service indicator indicates that service is required using a visual message (e.g., text), an audible message (e.g., chime), and/or a tactile message (e.g., vibration).

At 316, the method measures a second pressure using the high-pressure sensor. The high-pressure sensor may be located in a second supply rail routed from the high-pressure pump to one or more valve actuators. For example, the engine may have four cylinders with two or four valve actuators per cylinder, and the high-pressure pump may supply hydraulic fluid to all eight or all sixteen valve actuators.

At 318, the method estimates the second pressure based on a valve opening speed and/or the measured temperature of hydraulic fluid in the system. The valve opening speed is a speed at which the intake valve and/or the exhaust valve are opened. The method may determine the valve opening speed based on input from a valve position sensor.

At 320, the method determines whether a second (e.g., absolute) difference between the estimated second pressure and the measured second pressure is greater than a second threshold. If the second difference is greater than the second threshold, the method continues at 322. Otherwise, the method continues at 304. At 322, the method detects a fault in the high-pressure sensor. The method may set a DTC and/or activate the service indicator when a fault is detected in the high-pressure sensor.

The method may take one or more remedial actions when a fault is detected in the low-pressure sensor or the high pressure sensor. For example, the method may control the low-pressure pump and/or the high-pressure pump based on the estimated pressures instead of the measured pressures. In addition, the method may limit the duty cycle(s) of the low-pressure pump and/or the high-pressure pump. Furthermore, the method may adjust throttle position, fuel delivery, and/or spark generation to limit the engine speed to a predetermined speed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   a pressure estimation module that estimates a pressure of hydraulic fluid in a valve actuation system that actuates at least one of an intake valve and an exhaust valve of an engine; and
   a fault detection module that compares the estimated pressure to a pressure measured by a pressure sensor disposed in the valve actuation system and that detects a fault in the pressure sensor based on a difference between the estimated pressure and the measured pressure.

2. The system of claim 1, wherein the fault detection module detects the fault in the pressure sensor when the difference between the estimated pressure and the measured pressure is greater than a threshold.

3. The system of claim 2, wherein:
   the valve actuation system includes a first pump and a second pump;
   the first pump supplies fluid to the second pump at a first pressure; and
   the second pump supplies fluid to the valve actuator at a second pressure.

4. The system of claim 3, wherein the pressure estimation module estimates the first pressure based on a temperature of hydraulic fluid in the valve actuation system, a speed of the first pump, and a mass flow rate of hydraulic fluid in the valve actuation system.

5. The system of claim 3, wherein the pressure estimation module estimates the second pressure based on a temperature of hydraulic fluid in the valve actuation system and a speed at which the intake valve and the exhaust valve is opened.

6. The system of claim 3, wherein the first pump is electric and the second pump is driven by the engine.

7. The system of claim 4, further comprising a flow rate estimation module that estimates the mass flow rate of hydraulic fluid in the valve actuation system.

8. The system of claim 7, wherein the flow rate estimation module estimates the mass flow rate of hydraulic fluid in the valve actuation system based on the temperature of hydraulic fluid and a desired pressure of hydraulic fluid in the valve actuation system.

9. The system of claim 8, wherein the flow rate estimation module estimates the mass flow rate of hydraulic fluid in the valve actuation system based on an amount by which the at least one of the intake valve and the exhaust valve is lifted, a duration for which the at least one of the intake valve and the exhaust valve is opened, and a frequency at which the at least one of the intake valve and the exhaust valve is opened.

10. The system of claim 9, further comprising a frequency determination module that determines the frequency at which the at least one of the intake valve and the exhaust valve is opened based on engine speed and a number of times that the at least one of the intake valve and the exhaust valve is opened during an engine cycle.

11. A method comprising:
estimating a pressure of hydraulic fluid in a valve actuation system that actuates at least one of an intake valve and an exhaust valve of an engine; and
comparing the estimated pressure to a pressure measured by a pressure sensor disposed in the valve actuation system and that detects a fault in the pressure sensor based on a difference between the estimated pressure and the measured pressure.

12. The method of claim 11, further comprising detecting the fault in the pressure sensor when the difference between the estimated pressure and the measured pressure is greater than a threshold.

13. The method of claim 12, wherein:
the valve actuation system includes a first pump and a second pump;
the first pump supplies fluid to the second pump at a first pressure; and
the second pump supplies fluid to the valve actuator at a second pressure.

14. The method of claim 13, further comprising estimating the first pressure based on a temperature of hydraulic fluid in the valve actuation system, a speed of the first pump, and a mass flow rate of hydraulic fluid in the valve actuation system.

15. The method of claim 13, further comprising estimating the second pressure based on a temperature of hydraulic fluid in the valve actuation system and a speed at which the intake valve and the exhaust valve is opened.

16. The method of claim 13, wherein the first pump is electric and the second pump is driven by the engine.

17. The method of claim 14, further comprising estimating the mass flow rate of hydraulic fluid in the valve actuation system.

18. The method of claim 17, further comprising estimating the mass flow rate of hydraulic fluid in the valve actuation system based on the temperature of hydraulic fluid and a desired pressure of hydraulic fluid in the valve actuation system.

19. The method of claim 18, further comprising estimating the mass flow rate of hydraulic fluid in the valve actuation system based on an amount by which the at least one of the intake valve and the exhaust valve is lifted, a duration for which the at least one of the intake valve and the exhaust valve is opened, and a frequency at which the at least one of the intake valve and the exhaust valve is opened.

20. The method of claim 19, further comprising determining the frequency at which the at least one of the intake valve and the exhaust valve is opened based on engine speed and a number of times that the at least one of the intake valve and the exhaust valve is opened during an engine cycle.

* * * * *